Patented Nov. 25, 1924.

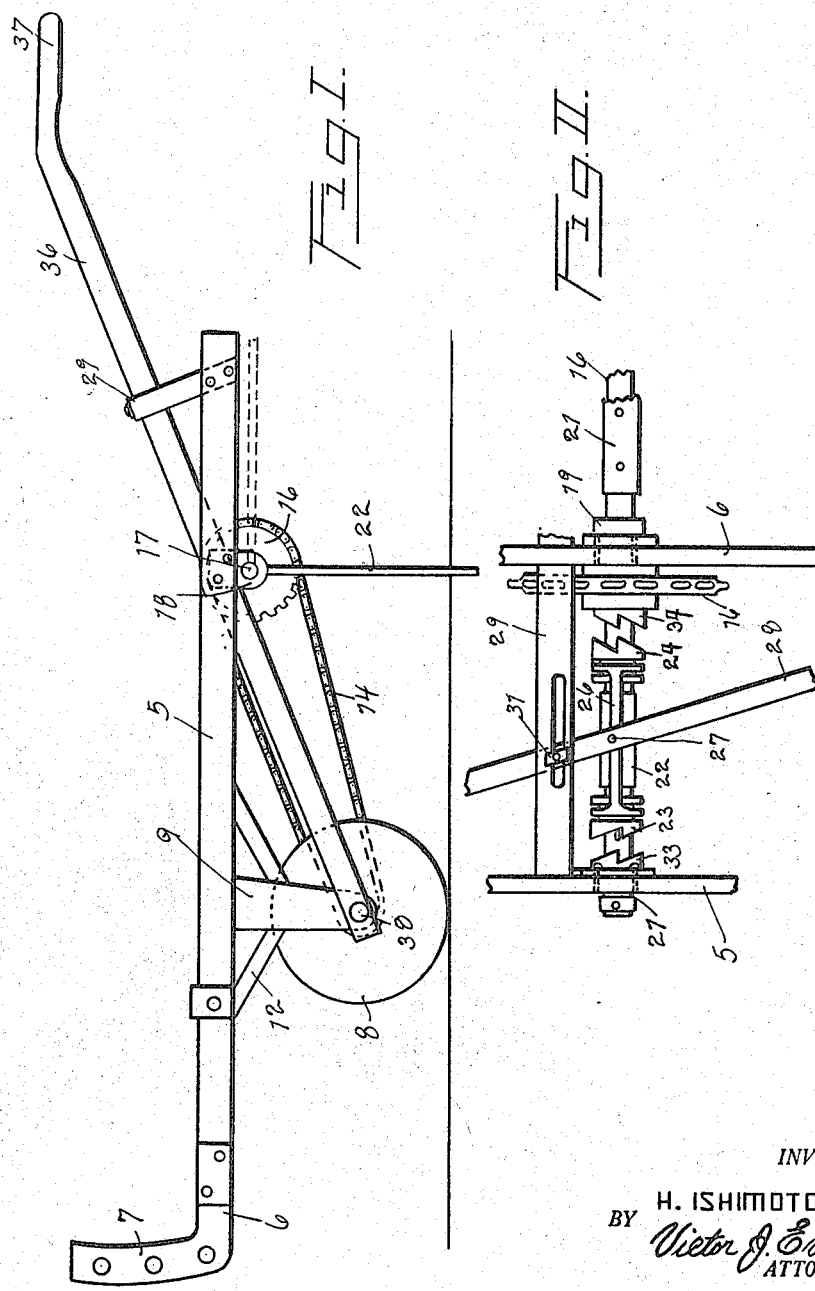

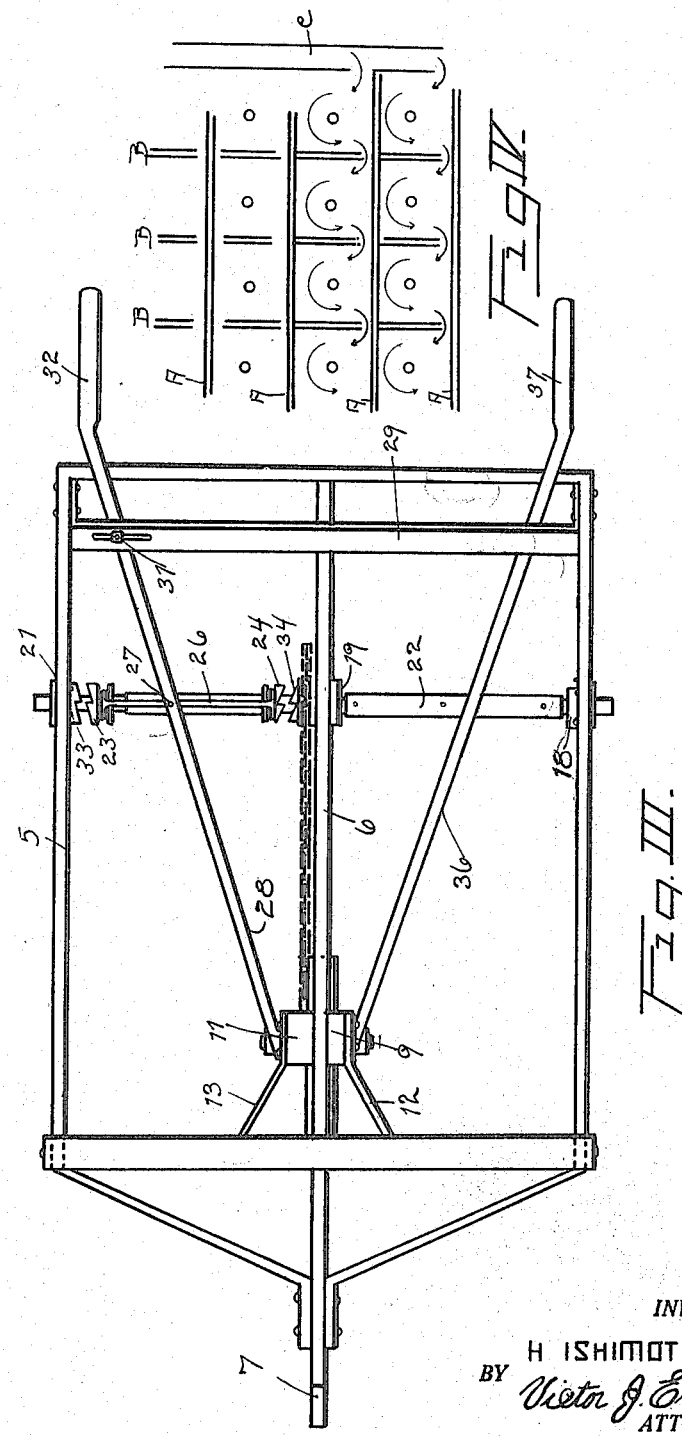

1,517,159

UNITED STATES PATENT OFFICE.

HACHIRO ISHIMOTO, OF MARYSVILLE, CALIFORNIA.

IRRIGATION DEVICE.

Application filed July 27, 1923. Serial No. 654,212.

*To all whom it may concern:*

Be it known that I, HACHIRO ISHIMOTO, a subject of the Emperor of Japan, residing at Marysville, in the county of Yuba and State of California, have invented new and useful Improvements in Irrigation Devices, of which the following is a specification.

This invention relates to improvements in irrigation devices.

The principal object of this invention is to produce a device capable of being moved over the land for the purpose of scraping dirt into a mound as is employed in irrigation work.

Another object is to produce a device of this character which is simple in construction and therefore cheap to manufacture.

A still further object is to produce a device which will not break down the mounds already formed and one which may be operated by an unskilled laborer.

Other objects and advantages will be apparent during the course of the following description.

In the accompanying drawings forming a part of this specification, and in which like numerals are employed to designate like parts throughout the same, Figure 1 is a side elevation of my device, Figure 2 is a fragmentary detail view showing the clutch control movement, Figure 3 is a top plan view of Figure 1, and Figure 4 is a diagrammatic view showing the manner of constructing irrigating mounds.

In irrigating it is common to employ a tractor which tractor passes through an orchard making mounds of dirt between each row of trees. The tractor then is caused to make mounds between each row of trees at right angles to the first rows of mounds. In making the second set of rows, the tractor's wheels break down the first rows and heretofore it has been necessary for a laborer with a shovel to reconstruct the mounds. With my device it is possible to pass over the ground and scrape the dirt back into the mound without the loss of time or physical effort.

In the accompanying drawings wherein for the purpose of illustration is shown a preferred embodiment of my invention, the numeral 5 designates a rectangular frame having a central member 6. This central member terminates in an upturned end 7 which acts as a draft-bar.

A ground wheel 8 is positioned below the frame 5 and secured to the central member 6 by depending arms 9 and 11. These arms are suitably braced as shown at 12 and 13. Secured to the wheel 8 is a sprocket (not shown) over which a chain 14 is adapted to pass. This chain is in turn passed over a sprocket 16 loosely mounted upon a shaft 17, which shaft is journaled to the frame 5 as shown at 18, 19 and 21. Suitable collars secured to the shaft prevent lateral movement.

Rigidly secured to the shaft 17 and depending therefrom is a scraper blade 22, while mounted upon the shaft 17 at a point between the central member 6 and the frame 5 is a set of clutch members. As shown at 23 and 24, these clutch members are both keyed to the shaft 17 and are slidably mounted through the means of a yoke 26 pivoted at 27 to a lever 28. This lever is slidably held to a cross-piece 29 of the frame 5, as shown at 31. It will be noted that the lever extends upwardly and terminates in a handle 32.

The clutch indicated by the numeral 23 is adapted to engage a similar clutch member 33 rigidly secured to the frame 5 while the clutch member 24 is adapted to be moved into engagement with a similar clutch member 34 rigid with the sprocket 16.

An arm 36 similar to the lever 28 is positioned beneath the brace 29, and is provided with a handle 37 similar to the handle 32. The lever 28 and the arm 36 both have their extremities secured to the pivot bolt 38 upon which the wheel 8 turns.

My device operates as follows:—

When it is desired to scrape the dirt into a mound the parts are placed in the position shown in Figure 1 and the vehicle is moved over the ground. At this time the clutch member 23 is caused to engage the clutch member 33 which holds the scraper blade 22 in a suitable position.

As soon as the margin of the mound has been reached the handle 32 is moved toward the handle 37 so as to cause the clutch 23 to disengage from the clutch 33 and thus cause the clutch 24 to engage with clutch 34. This action immediately transmits motion from the wheel 38 through the chain 14 to the shaft 17. The movement of the shaft thereafter moves the scraper into the dotted line position of Figure 1 at which time the scraper is moved beyond the margin of the mound and by again moving the handle 32 so as to release the clutches 24 and 34 the scraper will then drop to its normal position.

As soon as the clutches 23 and 33 are engaged the scraper will again be locked in this position ready for the construction of another mound.

Referring now to Figure 4, longitudinal mounds are shown at A, while cross mounds are shown at B. By viewing the upper mounds of this figure it will be noted that the tractor has caused a break in the mounds B which breaks must be partly closed as indicated in the lower part of this figure. By employing my device to close one side of these breaks, water coming from an irrigation ditch C will then flow, as shown by arrows, first around one tree, then around the next and so on across the field.

It will thus be seen that with this device it is possible to perform the objects set forth.

It is to be understood that the form of my invention, herewith shown and described is to be taken as a preferred example of the same and that various changes in the shape, size and arrangement of parts may be resorted to without departing from the spirit of the invention, or the scope of the subjoined claims.

Having thus described my invention, I claim:—

1. In an irrigation device a frame, a wheel mounted below said frame and adapted to contact the ground, a shaft secured to said frame, a scraper blade rigidly secured to said shaft, a sprocket rotably mounted on said shaft, clutch members slidably keyed to said shaft, one of said clutch members being adapted to lock said shaft against rotation, the other of said clutches being for the purpose of locking said shaft to said sprocket, means for driving said sprocket substantially as and for the purpose described.

2. In an irrigation device a frame, a shaft journaled to said frame, a wheel pivotally mounted below said frame, a sprocket secured to said wheel, a sprocket mounted on said shaft, a chain extending between said sprockets, a scraper blade rigidly secured to said shaft, means for locking said shaft to said sprocket, a second locking means associated with said first locking means whereby said shaft may be either locked to said sprocket or to said frame, and lever adapted to operate said first mentioned and said second mentioned locking means, substantially as and for the purpose described.

In testimony whereof I affix my signature.

HACHIRO ISHIMOTO.